Dec. 2, 1969   R. DU BOIS, JR., ET AL   3,481,062
TWO-COLOR VARIABLE INTENSITY DISPLAY
Filed Nov. 9, 1967
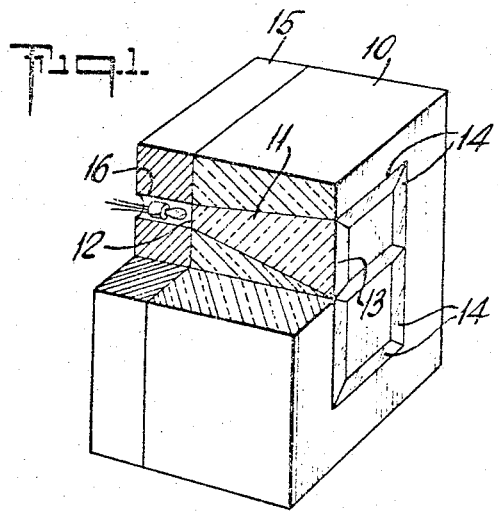
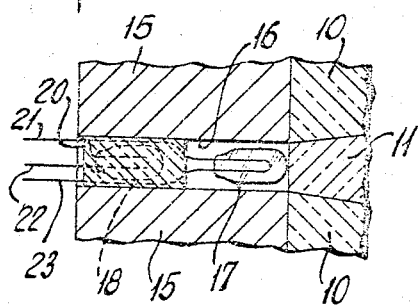
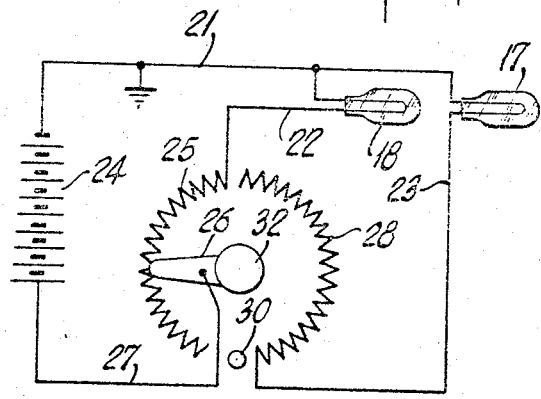
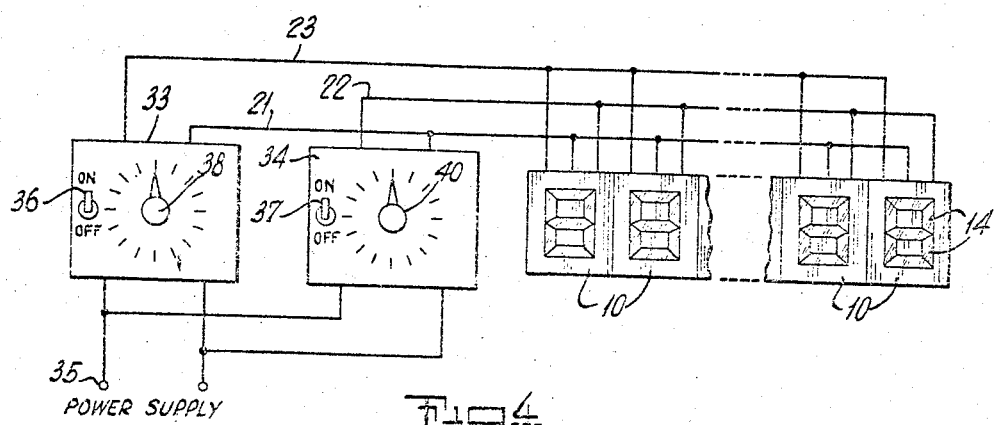
INVENTORS
RICHARD DU BOIS, JR.
GEORGE RUCKI
BY
Eyre, Mann & Lucas
ATTORNEYS

United States Patent Office 3,481,062
Patented Dec. 2, 1969

3,481,062
TWO-COLOR VARIABLE INTENSITY DISPLAY
Richard Du Bois, Jr., Caldwell Township, and George Rucki, Livingston, N.J., assignors to Wagner Electric Corporation, a corporation of Delaware
Filed Nov. 9, 1967, Ser. No. 681,802
Int. Cl. G09f 13/04
U.S. Cl. 40—130                9 Claims

ABSTRACT OF THE DISCLOSURE

Two electric lamps are positioned in a channel adjoining a transparent light transmitting rod which terminates at a display surface. One lamp is bare for high intensity, the other lamp is encased in a semi-transparent colored plastic for low intensity viewing. Variable resistors or variable voltage regulators are connected between a source of electric power and the lamps to vary the light intensity for viewing at night or in bright sunlight.

---

This invention relates to a combination light source used in a display device. The display may show a series of digits or letters for designating information supplied from an electric circuit, computing device, or measuring instrument. The invention has particular reference to a means for varying the color of the display as well as the intensity.

Display devices showing a series of digits or letters are important sources of information when used in conjunction with the operation of complicated mechanisms, such as airplanes, power plants, and defense control centers. Some of these installations are subject to variable light conditions, especially on airplanes which may be flying at night with a minimum of ambient light, or in bright sunlight with maximum illumination.

This invention provides a control means whereby a single control knob can be used to vary the intensity and color of such displays to provide maximum visibility. To produce the desired results, two lamps are positioned within a metal cylindrical channel adjoining a transparent light transmitting rod. The lamp adjacent the transparent rod is bare and is used for maximum intensity. Behind the bare lamp, a second lamp is enclosed in a colored plastic envelope and is used for minimum intensity.

FIG. 1 is an isometric view of the display device with a part cut away to show the position of the transparent rod, the channel, and the two lamps.

FIG. 2 is a cross sectional view of the channel and a portion of the transparent rod, showing the two lamps in greater detail.

FIG. 3 is a wiring diagram showing how two lamps behind one segment may be connected to a variable resistance and a source of potential.

FIG. 4 is a side view of two control units connected to a plurality of digit indicators.

Referring now to FIGS. 1 and 2, the display device comprises a block 10 of material which is not transparent and which acts to hold all the display components together. A transparent rod 11 is encased within block 10 and comprises an entrance surface 13 which is generally flush with one surface of the block 10. The rod 11 is preferably made of a transparent plastic such as Lucite but it may also be made of glass if desirable. Each rod 11 is preferably coated with a reflective layer such as silver for reflecting all the light transmitted through the entrance surface 12 toward the exit surface 13. The exit surface 13 is part of a pattern which includes the exit surfaces 14 of other similar rods. This pattern can be used to show digits and other symbols by the selective lighting of lamps associated with the rods.

A metal block 15 is positioned adjoining block 10 and contains a plurality of channels 16. The channels 16 are preferably in the form of a cylinder and have reflective internal surfaces. The internal ends of the channel 16 are positioned in adjoining relationship with the entrance channels 12 so that all or most of the light passing through the channel 16 enters the rods 11 and is transmitted to the exit surface 13. The block 15 is preferably made of aluminum but any other suitable metal may be used. Within the channel two lamps 17 and 18 are positioned. One of the lamps 17 is an incandescent electric lamp having a clear glass envelope. The second lamp 18 is preferably the same type as the first lamp 17 but it is enclosed within a colored plastic cylinder 20 which just fits within cylinder 16. The colored envelope 20 acts as a filter and transmits only a selected portion of the light spectrum. For most uses, especially on airplanes, the plastic envelope 20 is made with a light blue color.

Neither of the lamps 17 nor 18 are based with the usual metal bases. The lead-in wires from the lamp filaments are enclosed within the envelope 20 which acts as a base substitute. As shown in the drawing, two of the lead-in wires are joined together to form a common lead 21. The other two lead-in wires 22 and 23 are brought out through the open end of the channel 16 for connection to a source of potential in series with a variable resistor.

FIG. 3 illustrates the means for connecting the two lamps 17 and 18 to a source of electric power 24 which in FIG. 3 is shown as a direct current source. However, it is obvious that an alternating current supply may be employed. In FIG. 3 conductor 22 is connected to one end of a resistor 25 which is shown as part of a circular variable resistor having a contact arm 26. Arm 26 is connected to conductor 27 which is connected to one terminal of the source of power 24. Lead-in conductor 23, connected to lamp 17, is connected to another portion 28 of the circular resistor. Arm 26 is arranged for making contact with this resistor portion as well as the first portion 25. An OFF contact 30 may be made a part of the variable resistor so that an operator may extinguish both lamps when the display device is not in use.

The circuit shown in FIG. 3 illustrates one means for controlling the current to lamps in a single segment. A resistance control cannot be used for a large number of lamps which are being turned on and off to indicate a variable series of numbers because the current required is variable over a wide range and the potential drop across the resistors varies accordingly.

A suitable power source is shown in FIG. 4. Two voltage regulators 33 and 34 are connected to common power supply terminals 35 and provide a voltage stabilized output carried by conductors 21, 22 and 23. Conductors 21 and 23 are connected to all the lamps 17 having clear glass envelopes. Conductors 21 and 22 supply all the lamps 18 enclosed in a filter material 20. Each set of lamps 17, 18 is connected in series with a switching means (not shown) which is operated by a digit control means to light up the desired digits in blocks 10. Each voltage regulator 33 and 34 has its ON-OFF switch 36 and 37, and each has a manual control knob 38 and 40 for varying the output voltage.

During the operation of this display means, the operator adjusts the voltage regulators to obtain the best visibility. As light conditions change, additional adjustments may be necessary. Lamp 17 is positioned between lamp 18 and the entrance surface of rod 11 and this arrangement cuts out a great deal of light from lamp 18 in the colored envelope 20. This condition, however, is desirable since the lamp 18 is designed to produce low levels of illumination at exit surface 13.

From the above description of the display device and its operation, it will be evident that the invention provides a variable source of illumination at a viewing surface which can be adjusted by an operator over a wide range of illumination values and which changes to a desired color when the low levels of illumination are produced.

The foregoing disclosure and drawings are merely illustrative of the principles of this invention and are not to be interpreted in a limiting sense. The only limitations are to be determined from the scope of the appended claims.

What is claimed is:

1. A variable intensity two color display device comprising:
   (1) a plurality of rods, each operative to transmit light from one end to the other end, and arranged to form a display at said other ends thereof,
   (2) an opaque supporting block operative to retain said rods in a predetermined spacial relationship,
   (3) a plurality of lighting means each comprising a first lamp of a first color situated adjacent said one end of an associated rod and a second lamp of a second color adajacent said first lamp, each lamp having lead-in conductors, and
   (4) supporting means adjoining said opaque supporting block and having a plurality of channels operative to retain each of said plurality of lighting means adjacent said one end of an associated rod.

2. A display device as claimed in claim 1 wherein each of said plurality of light transmitting rods has a metallic reflecting coating on its sides.

3. A display device as claimed in claim 1 wherein said supporting means is made of aluminum.

4. A display device as claimed in claim 1 wherein the first lamp includes a clear glass sealed envelope.

5. A display device as claimed in claim 1 wherein the second lamp includes a colored glass sealed envelope.

6. A display device as claimed in claim 1 wherein the second lamp includes a clear glass envelope enclosed in colored plastic, said colored plastic having substantially the same cross-section as each of said plurality of channels in said support means.

7. A display device as claimed in claim 5 wherein at least three lead-in wires are sealed within the colored plastic and are brought out through the channel for connection to a source of electric power.

8. A two-color variable intensity display circuit comprising:
   (a) a plurality of the display device of claim 1;
   (b) first and second variable resistors connectable in series with said first and second lamps, respectively, of said display means; and
   (c) a source of electric power connectable in series with either said first variable resistor or said second variable resistor.

9. A two-color variable intensity display circuit comprising:
   (a) a plurality of the display device of claim 1;
   (b) first and second variable voltage regulation means having input and output terminals, the first and second lamps of said display means being connected across the output terminals of said first and second variable voltage regulation means, respectively;
   (c) a source of electric power connected across the input terminals of both said first and second variable voltage regulation means.

References Cited

UNITED STATES PATENTS

| | | | |
|---|---|---|---|
| 2,589,569 | 3/1952 | Peter et al. | 340—380 |
| 2,740,957 | 4/1956 | Davies. | |
| 2,918,034 | 12/1959 | Neugass. | |
| 3,164,918 | 1/1965 | Brown. | |
| 3,226,864 | 1/1966 | Rehler. | |

EUGENE R. CAPOZIO, Primary Examiner

RICHARD CARTER, Assistant Examiner